United States Patent
Bird et al.

(10) Patent No.: US 7,433,950 B2
(45) Date of Patent: Oct. 7, 2008

(54) METHOD AND MECHANISM TO MULTIPLEX MULTIPLE APPLICATION SERVER REQUESTS OVER A SINGLE DATABASE CONNECTION

(75) Inventors: Paul M. Bird, Markham (CA); William R. Bireley, Morgan Hill, CA (US); Curt L. Cotner, Gilroy, CA (US); Tammie Dang, Morgan Hill, CA (US); Margaret A. Dong, San Jose, CA (US); Georgia C. Fuller, San Jose, CA (US); Michelle D. Lam, San Jose, CA (US); James W. Pickel, Gilroy, CA (US); Frankie K. Sun, North York (CA)

(73) Assignee: International Business Machines Corporation, Armonk, NY (US)

( * ) Notice: Subject to any disclaimer, the term of this patent is extended or adjusted under 35 U.S.C. 154(b) by 765 days.

(21) Appl. No.: 10/729,636

(22) Filed: Dec. 4, 2003

(65) Prior Publication Data

US 2005/0144276 A1    Jun. 30, 2005

(51) Int. Cl.
*G06F 15/173* (2006.01)
(52) U.S. Cl. ............... 709/225; 709/232; 709/217; 709/201; 707/10; 707/202
(58) Field of Classification Search ........... 709/225, 709/232, 217, 201; 707/10, 202
See application file for complete search history.

(56) References Cited

U.S. PATENT DOCUMENTS 5,835,757 A * 11/1998 Oulid-Aissa et al. ......... 707/10
6,085,238 A * 7/2000 Yuasa et al. ................. 709/223
6,150,599 A   11/2000 Fay et al. ...................... 84/609
6,182,086 B1 * 1/2001 Lomet et al. ................ 707/202
6,301,584 B1  10/2001 Ranger ........................ 707/103
6,351,772 B1   2/2002 Murphy, Jr. et al. ......... 709/227
6,356,886 B1   3/2002 Doyle ........................... 706/46
6,430,607 B1 * 8/2002 Kavner ........................ 709/217
6,477,537 B2  11/2002 Gustman ..................... 707/102
6,591,266 B1   7/2003 Li et al. ........................ 707/10
2002/0099870 A1  7/2002 Miller et al. ................. 709/328
2003/0212660 A1 11/2003 Kerwin .......................... 707/1

* cited by examiner

Primary Examiner—Nathan J. Flynn
Assistant Examiner—Kyung H Shin
(74) Attorney, Agent, or Firm—Sawyer Law Group LLP

(57) ABSTRACT

In a method for avoiding section collision for application server requests over a single database connection, the database server assigns query identifiers to each instance of the same cursor opened for the same processing level within an application, allowing multiple instances of the same cursor to be processed in parallel without section collision. The application server assigns a command source identifier to each statement sent over a single database connection to uniquely identify the application source of the statement. This applies for multiples of the same statement sent by different application sources within the same application, for a single statement containing multiple application sources, and for multiple statements from different applications multiplexed over a single database connection. These statements can be processed separately from and in parallel with the each other without section collision.

14 Claims, 8 Drawing Sheets

METHOD AND MECHANISM TO MULTIPLEX MULTIPLE APPLICATION SERVER REQUESTS OVER A SINGLE DATABASE CONNECTION

FIELD OF THE INVENTION

The present invention relates to the processing of application server requests in database systems, and more particularly to the processing of multiple application server requests multiplexed over a single database connection.

BACKGROUND OF THE INVENTION

FIG. 1 illustrates a conventional relational database system. The system includes an application server 101 communicating with a database server 102. An application 103 at the application server 101 issues requests to the database server 102 using a query language, such as Structured Query Language (SQL). SQL supports cursors, stored procedures, and user defined functions. A cursor is a named control structure used by an application to point to a specific row within some ordered set of rows. A stored procedure is a block of procedural constructs and embedded statements that are stored in a database and can be called by name. A user defined function is defined to the database management system and can be referenced thereafter in SQL queries.

When the application 103 issues a request to the database server 102, the statement is sent with parameters, including a package name, a consistency token, and a section number. The database engine at the database server 102 prepares to execute the statement by creating data structures that represent the package and the section number. The consistency token helps to maintain consistency between the data structures that were created and the application that is being executed. The package name identifies the application source and the statements contained therein. Application sources are programs or sub-programs. A section number is assigned to each unique statement in the package and serves to associate the statement with the corresponding data structures at the database server 102.

However, a problem with the conventional system is section collision, where the section identifier for multiple statements sent over a single database connection is identical. Such section collision results when multiples of the same statement are sent over a single database connection. In this situation, section collision occurs in several ways: (1) multiples of the same statement are sent over a single database connection from different application sources within the same application; (2) a single statement containing multiple application sources is sent; (3) multiples of the same statement from different applications are multiplexed over a single database connection; and (4) multiple open cursor statements for the same cursor are sent over a single database connection.

To illustrate section collision due to multiples of the same statement sent from different application sources within the same application over a single database connection, assume that two different application sources within the same application 103 issues a "CALL SP1" over the same database connection. Both of these statements would have identical package names and section numbers since they contain the same statements.

To illustrate section collision due to a single statement containing multiple application sources being sent over a database connection, assume that the application 103 sends the following statement: "SELECT UDF1(x), UDF2(x), UDF3(x) FROM T1". If all three UDF's are written in Java, each of these UDF's can be executed in its own JVM environment on an intermediate server which is unaware of any other JVM, and with all three JVM's being multiplexed through a single database connection to the database server 102. Because all three UDF's are executing the same package and statements, each JVM may issue a prepare using an identical section within the package, causing collision with one another.

To illustrate section collision due to multiples of the same statement from different applications multiplexed over a single database connection, assume that a first application issues an "OPEN C1" statement over a connection, and a second application issues an "OPEN C1" statement over the same connection. Both of these statements would have the same package name and section number, resulting in section collision. Conventionally, to avoid this problem, the two statements would be issued using separate threads or connections. This prevents the bandwidth of the connection from being fully utilized.

Section collision due to multiple open cursor statements for the same cursor sent over a single database connection results from the restriction of conventional database systems that there can be only one instance of an open cursor of a specific name at the same processing, or nesting level, within an application. For example, assume that the application 103 issues the statement, "OPEN C1", to the database server 102 to open the cursor named "C1". The database server 102 then creates control structures 104 representing the package, the section, and any other needed runtime structures for the statement. But, if the application 103 issues another "OPEN C1" statement, using the same database connection, before the first open cursor closes, then an error occurs. The second open cursor statement would have the same section number as the first open cursor statement. To process both open cursors would result in section collision.

Some database systems would allow the second invocation, but would also close the first open cursor, losing all information from the first open cursor. Other database systems would keep the first cursor information, but would refuse to allow the second cursor to be opened. Still other database systems would use separate threads or remote connections between the application server 101 and the database server 102 to separate the application into multiple processes. This latter approach, however, has a significantly negative impact on performance.

Accordingly, there exists a need for a method and system for uniquely identifying application server requests multiplexed over a single database connection. The present invention addresses such a need.

SUMMARY OF THE INVENTION

In a method and system for avoiding section collision for application server requests over a single database connection, the database server assigns query identifiers to each instance of the same cursor opened for the same processing level within an application, allowing multiple instances of the same cursor to be processed in parallel without section collision. The application server assigns a command source identifier to each statement sent over a single database connection to uniquely identify the application source of the statement. This applies for multiples of the same statement sent by different application sources within the same application, for a single statement containing multiple application sources, and for multiple query statements from different applications multiplexed over a single database connection. These statements can be processed separately from and in parallel with the each other without section collision.

DETAILED DESCRIPTION

The present invention provides a method and system for uniquely identifying application server requests multiplexed over a single database connection. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

In the method and system in accordance with the present invention, the application server assigns a command source identifier to each statement sent over a single database connection to uniquely identify the application source of the statement. The command source identifier uniquely identifies the application source for multiples of the same statement sent by different application sources within the same application, the application sources for a single statement containing multiple application sources, and the application sources for multiple statements from different applications multiplexed over a single database connection. These statements can be processed separately from and in parallel with the each other without section collision. Further, the database server assigns query identifiers to each instance of the same cursor opened for the same processing level within an application.

To more particularly describe the features of the present invention, please refer to FIGS. 2 through 8 in conjunction with the discussion below.

Figure 1:
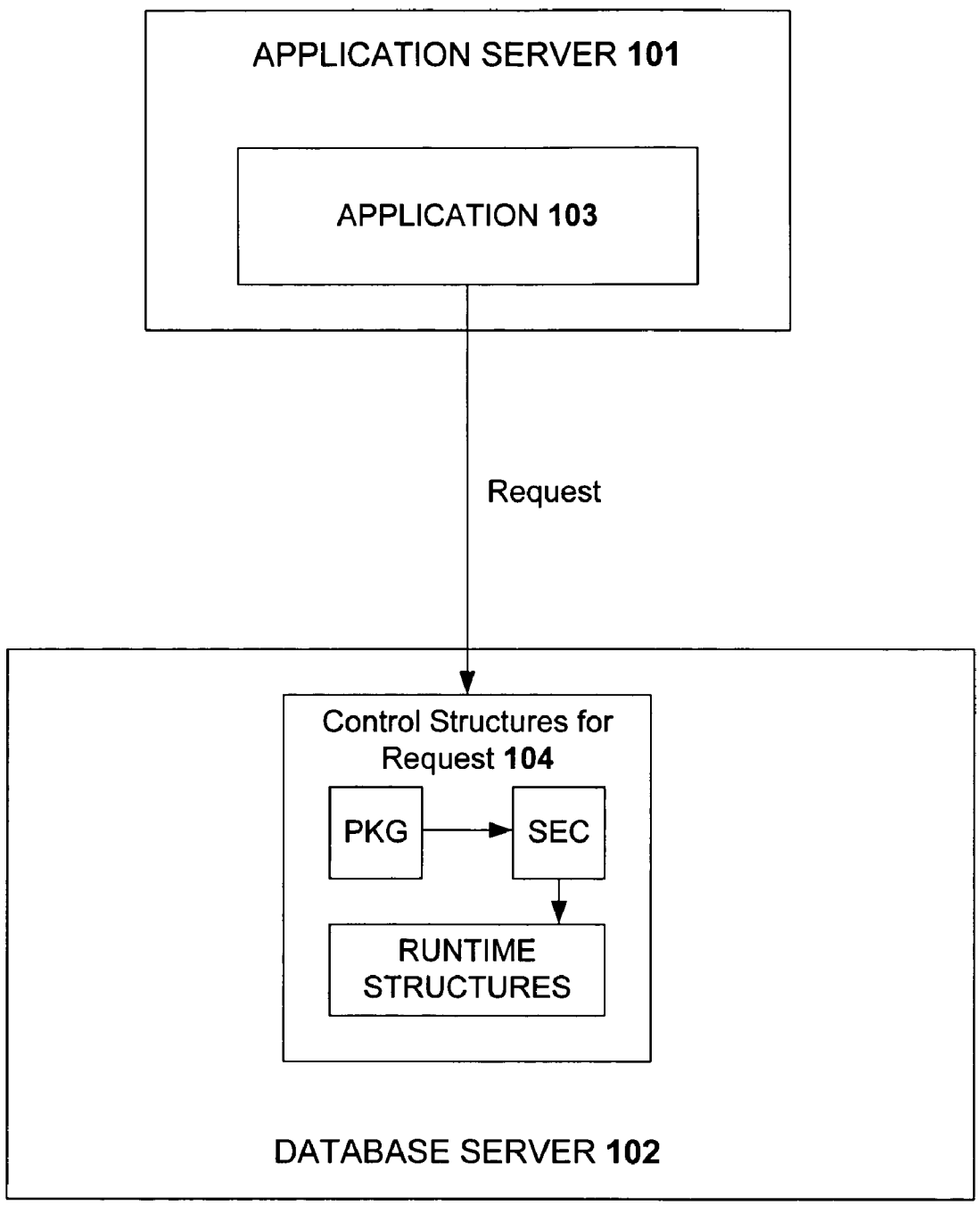
FIG. 1 illustrates a conventional relational database system.
Figure 2:
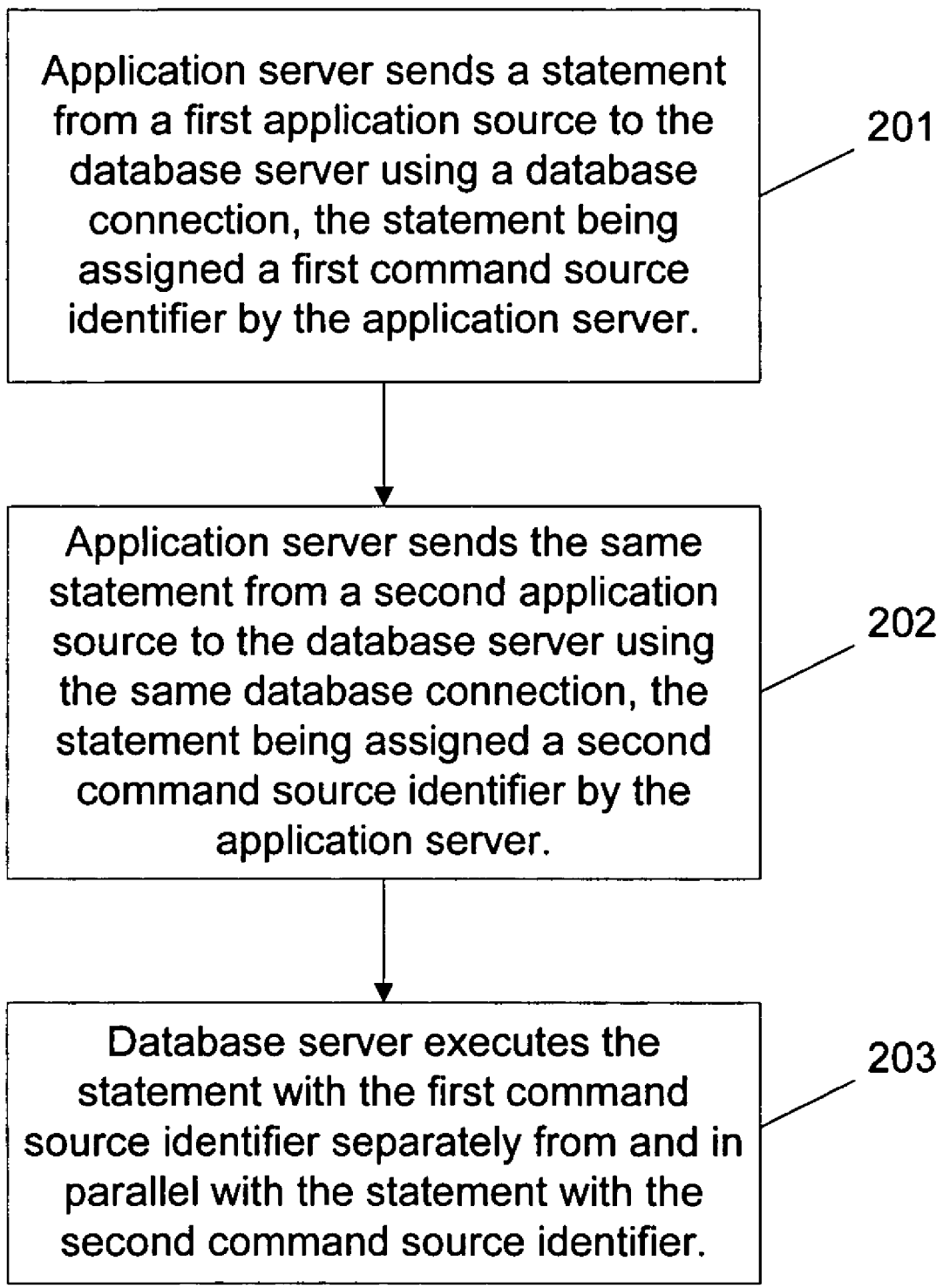
FIG. 2 is a flowchart illustrating a preferred embodiment of a method for avoiding section collision for application server requests over a single database connection in accordance with the present invention.

FIG. 2 is a flowchart illustrating a preferred embodiment of a method for avoiding section collision for application server requests over a single database connection in accordance with the present invention. The preferred embodiment adds a command source identifier to the existing parameters of a statement to uniquely identify a statement's application source. The application source can be a stored procedure, a user defined function, or a trigger. First, an application server sends a statement from a first application source to a database server using a database connection, the statement being assigned a first command source identifier by the application server, via step 201. The application server also sends the same statement from a second application source to the database server using the same database connection, the statement being assigned a second command source identifier by the application server, via step 202. The database server then executes the statement with the first command source identifier separately from and in parallel with the execution of the statement with the second command source identifier, via step 203.

Figure 3:
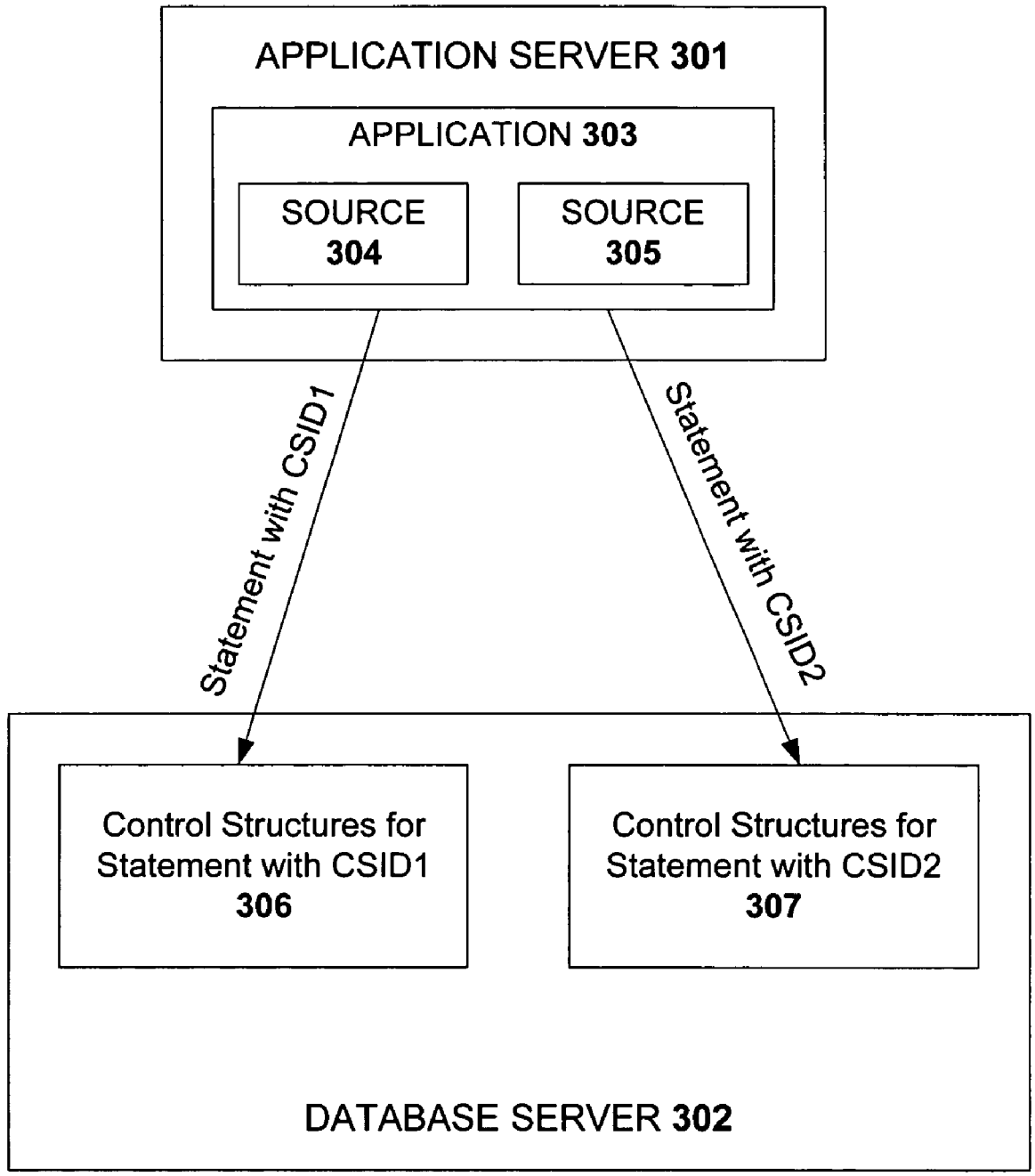
FIG. 3 is a block diagram illustrating the use of the command source identifier to avoid section collision due to the same statement from different application sources within the same application being sent on a single database connection.

FIG. 3 is a block diagram illustrating the use of the command source identifier to avoid section collision due to the same statement from different application sources within the same application being sent on a single database connection. First, the application server 301 sends a statement from a first application source 304 within the application 303 to the database server 302, the statement being assigned a first command source identifier, CSID1, by the application server 301, via step 201. The first command source identifier, CSID1, uniquely identifies the application source 304. The application server 301 also sends the same statement from a second application source 305 within the application 303 to the database server 302 over the same database connection, the statement being assigned a second command source identifier, CSID2, by the application server 301, via step 202. The database server 302 then creates the control structures 306 to execute the statement with CSID1. The database server 302 also creates a set of control structures 307 to execute the statement with CSID2. The statement with CSID1 is then executed separately from and in parallel with the statement with CSID2, via step 203, without section collision. With the command source identifiers, the database server 302 is able to uniquely identify which application source sent the statement, even if the statements have the same section number, thus avoiding section collision.

Figure 4:
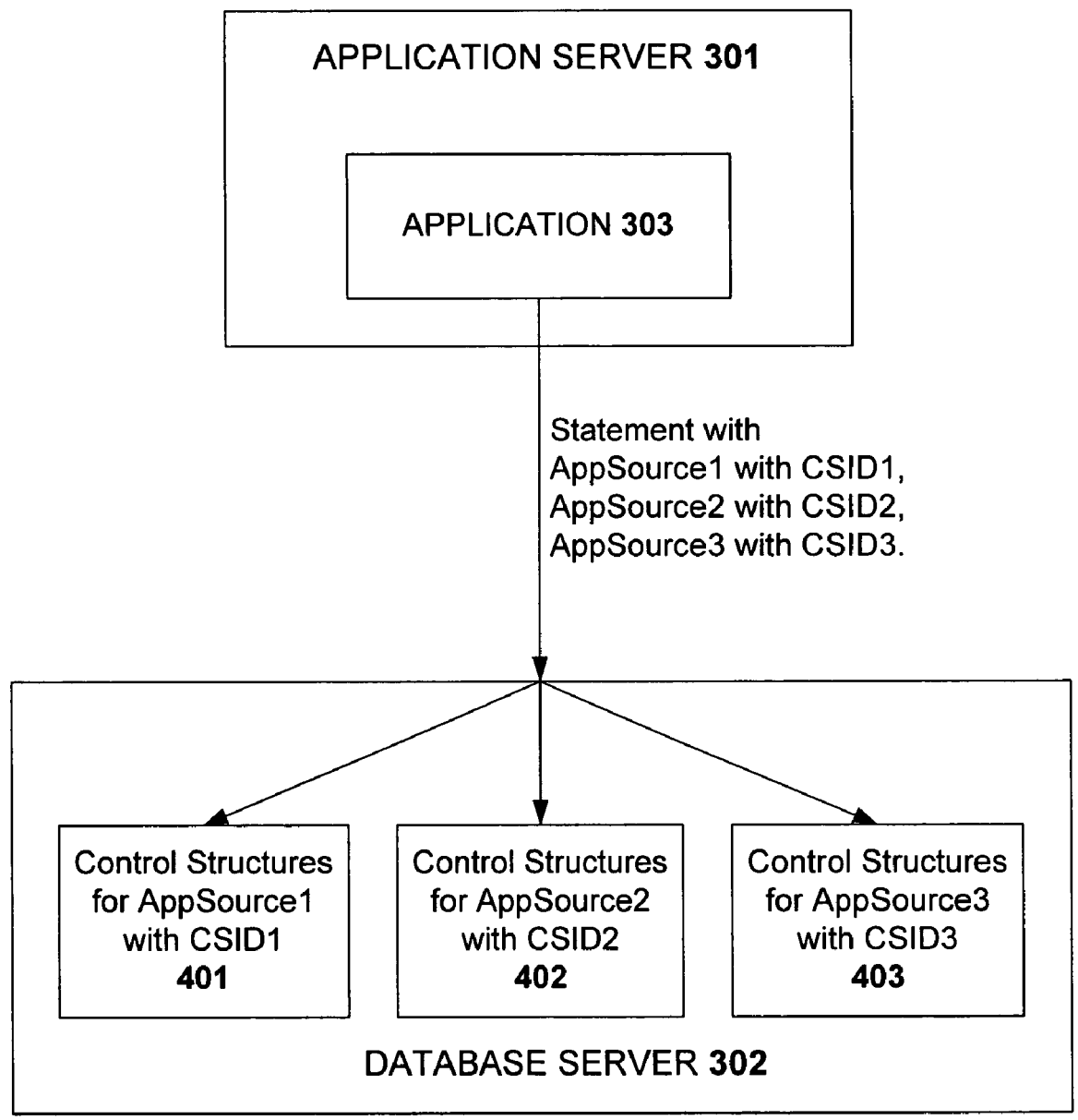
FIG. 4 is a block diagram illustrating the use of the command source identifier to avoid section collision due to a single statement containing multiple application sources.

FIG. 4 is a block diagram illustrating the use of the command source identifier to avoid section collision due to a single statement containing multiple application sources. First, the application server 301 sends a statement containing multiple application sources (AppSource1, AppSource2, and AppSource 3) to the database server 302. Each application source in the statement is assigned a unique command source identifier (CSID1, CSID2, and CSID3, respectively) by the application server 301, via steps 201 and 202. Thus, in this situation, the first and second statements from FIG. 2 have been combined in a single statement. For example, assume that the following statement is sent:

SELECT UDF1(x), UDF2(x), UDF3(x) FROM T1

Each UDF in the statement is a separate application source. The application server 301 assigns each UDF a separate command source identifier. For example, UDF1(x) is assigned CSID1; UDF2(x) is assigned CSID2; and UDF3(x) is assigned CSID3. When the database server 302 processes the statements from within each UDF, separate control structures 401, 402, and 403 are created for each UDF. Each UDF is then executed separately from and in parallel with the others, with each part identified by its respective command source identifier, via step 203. Thus, section collision is avoided.

Figure 5:
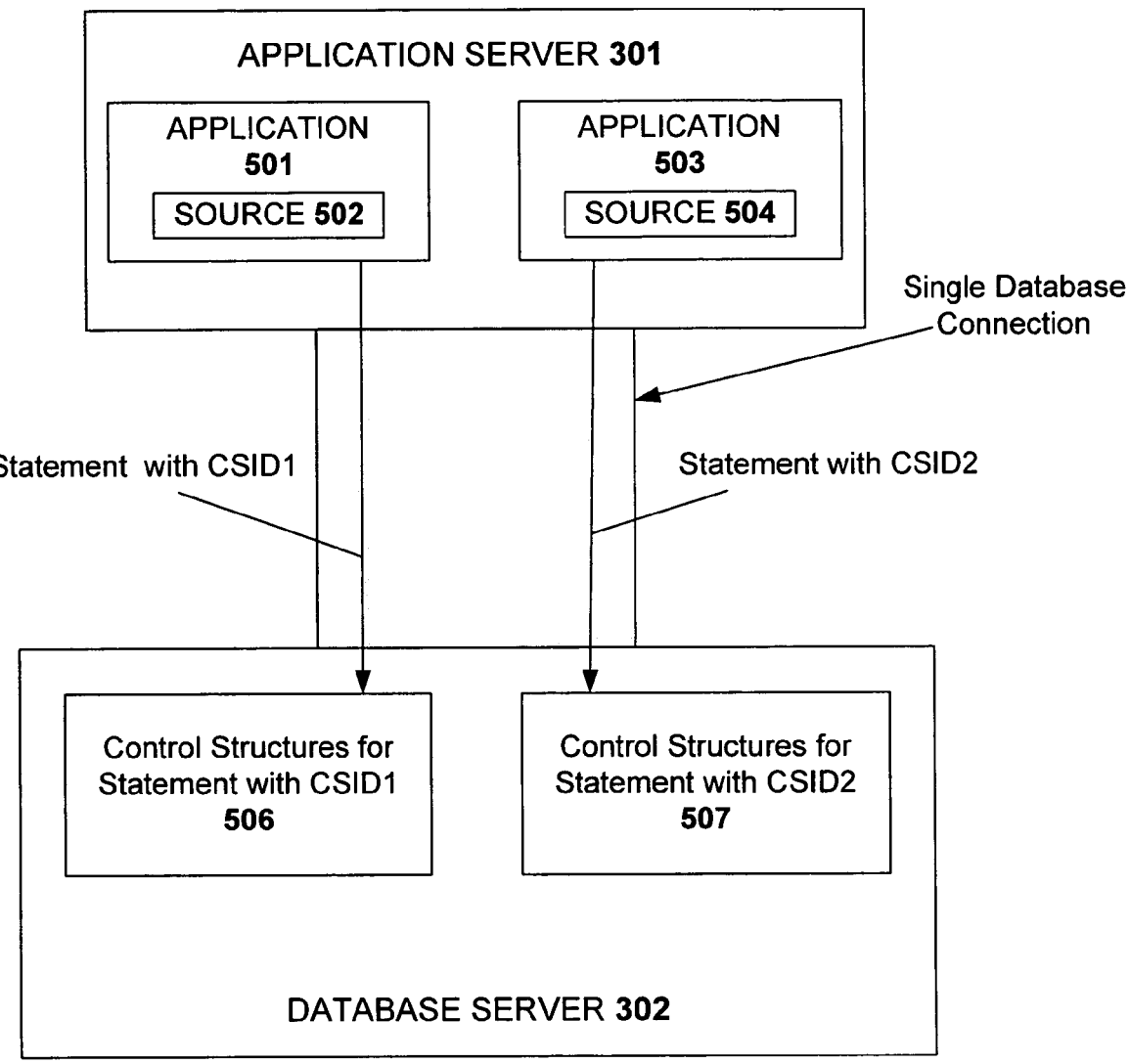
FIG. 5 is a block diagram illustrating the use of the command source identifier to avoid section collision due to multiples of the same statement from different applications being multiplexed over the same database connection.

FIG. 5 is a block diagram illustrating the use of the command source identifier to avoid section collision due to multiples of the same statement from different applications being multiplexed over the same database connection. First, the application server 301 sends a statement from a first application source 502 within a first application 501 to the database server 302 over a database connection, via step 201, where the application server 301 has assigned a first command source identifier, CSID1, to this statement to uniquely identify the application source 502. The application server 301 sends the same statement for a second application source 504 within a second application 503 to the database server 302 over the same database connection, via step 202, where the application server 301 has assigned a second command source identifier, CSID2, to this statement to uniquely identify the application source 504. The database server 302 then creates the control structures 505 for the statement with CSID1, and the control structures 506 for the statement with CSID2. The database server 302 then executes the statement with CSID1 separately from and in parallel with the statement with CSID2, thus avoiding section collision. Separate database connections are not required in this case, allowing the available bandwidth of the database connection to be more fully utilized.

When multiple open cursor statements for the same cursor in a single application source are sent over a single database connection, the use of the command source identifier does not avoid section collision. In this situation, both open cursor statements would have the same command source identifier, as they are from the one application source. To address this problem, the present invention assigns unique query identifiers to each instance of the same cursor opened for the same processing level within an application.

Figure 6:
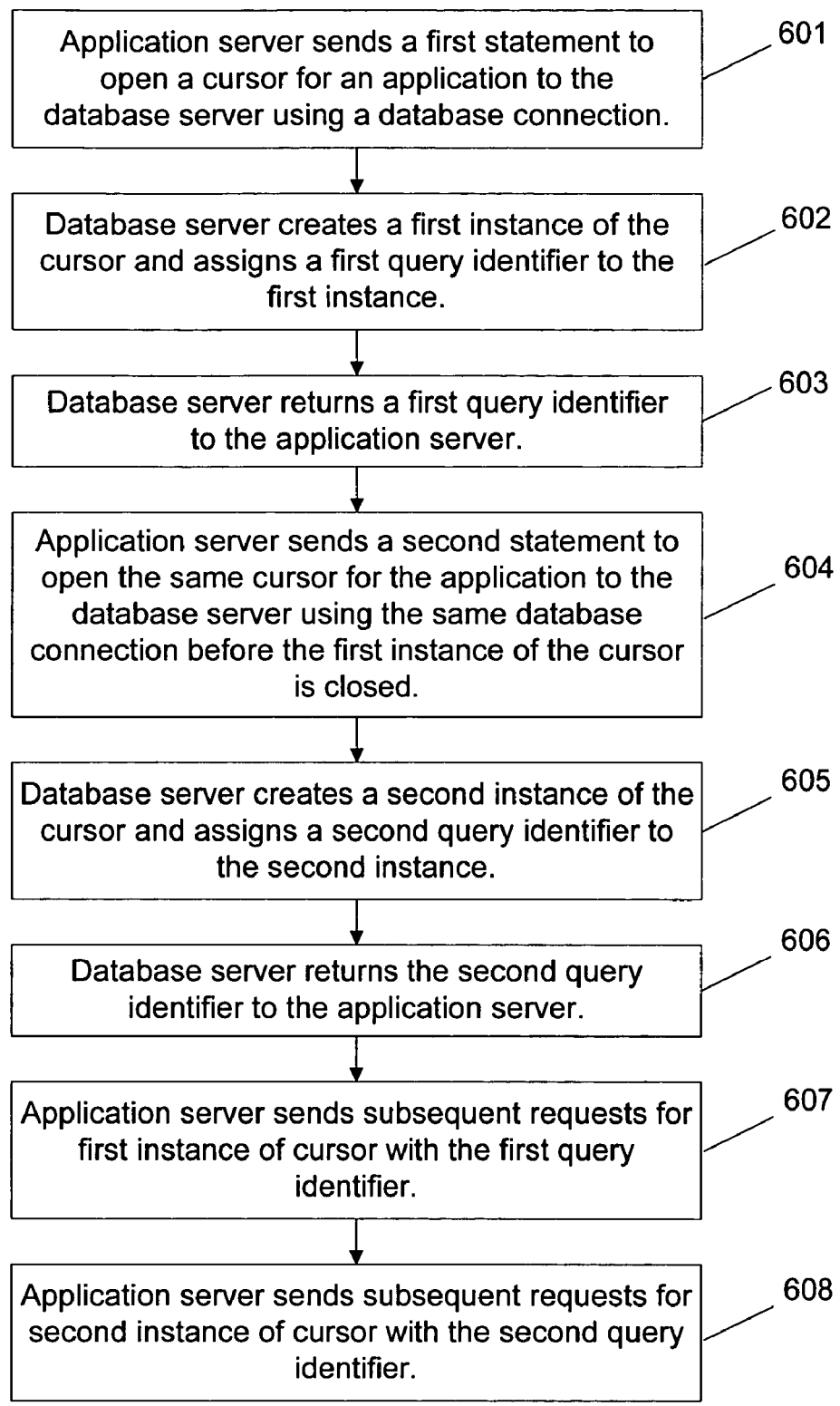
FIG. 6 is a flowchart illustrating the use of a query identifier to avoid section collision for multiple open cursor statements multiplexed over a single database connection in accordance with the present invention.
Figure 7:
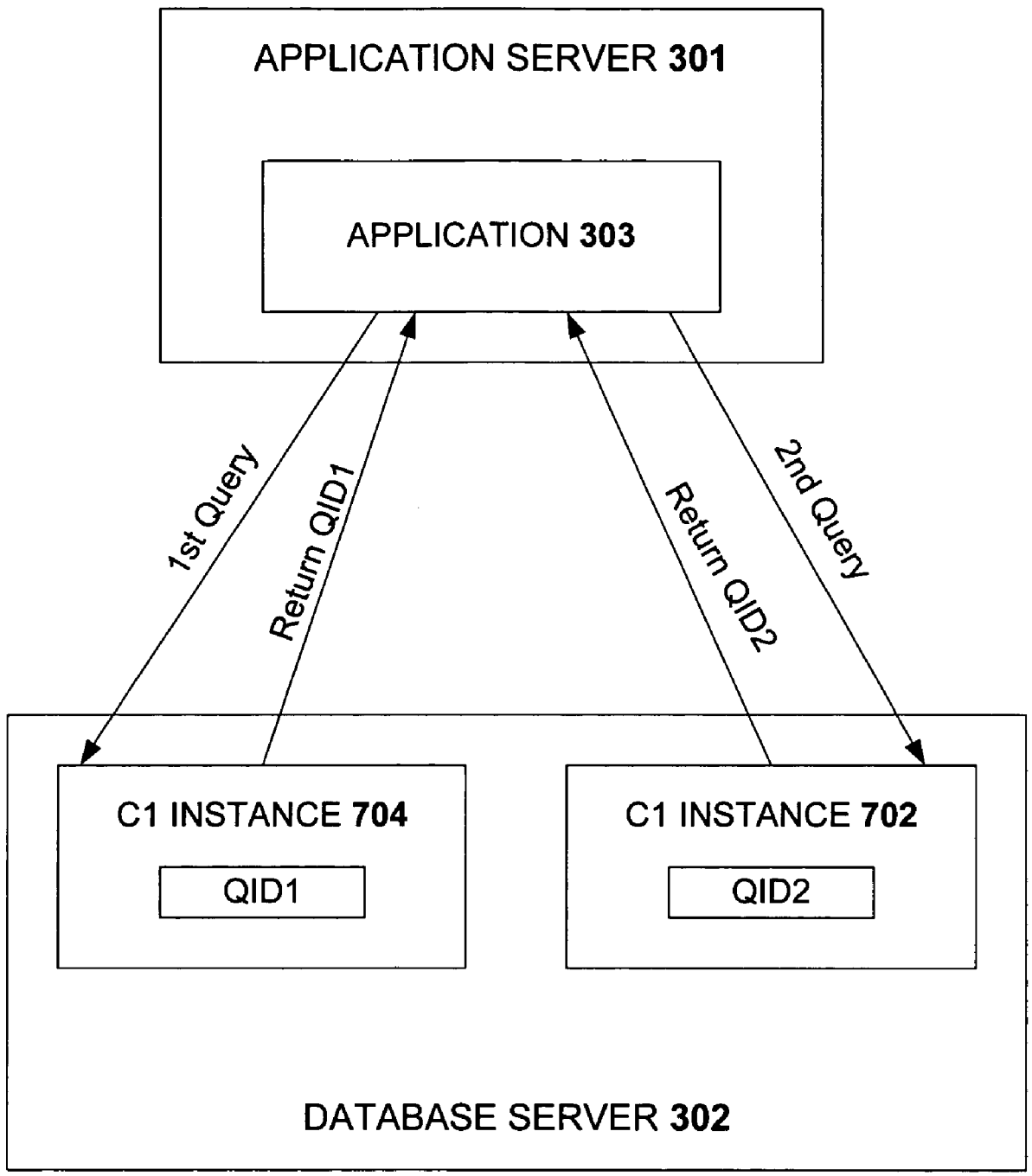
FIG. 7 is a block diagram illustrating the use of query identifiers to avoid section collision for multiple open cursor statements multiplexed over a single database connection in accordance with the present invention.

FIG. 6 is a flowchart illustrating the use of the query identifier to avoid section collision for multiple open cursors statements for the same cursor name multiplexed over a single database connection. FIG. 7 is a block diagram illustrating the use of query identifiers to avoid section collision. Referring to both FIGS. 6 and 7, the application server 301 sends a first statement, such as "OPEN C1", to open a cursor for an application 303 to the database server 302 using a database connection between the application server 301 and the database server 302, via step 601. Upon receiving the first statement, the database server 302 creates a first instance 701 of the cursor, C1, and assigns a first query identifier, QID1, to the first instance 701, via step 602. The database server 302 returns the first query identifier, QID1, to the application server 301, via step 303. Then, the application server 301 sends a second statement, "OPEN C1", to open the same cursor to the database server 302 using the same database connection, via step 604, before the first instance 701 of the cursor is closed. Upon receiving the second statement, the database server 302 creates a second instance 702 of the cursor and assigns a second query identifier, QID2, to the second instance 702, via step 605. The database server 302 returns the second query identifier, QID2, to the application server 301, via step 606. Subsequent statements from the application server 301 for the first instance 701 of the cursor are then sent with the first query identifier, QID1, via step 607. Subsequent statements from the application server 301 for the second instance 702 of the cursor are then sent with the second query identifier, QID2, via step 608. In combination with the other parameters sent with each statement, the query identifier uniquely identifies the intended instance of an open cursor. Thus, the query identifiers allow multiple instances of the same cursor to be processed in parallel with each other without section collision.

A "duplicate query allowed" (DQA) parameter can be provided in conjunction with the query identifier to allow backward compatibility to existing database systems. The DQA parameter signifies that the requesting system allows duplicates instances of the same cursor to be created for the same application source. This provides the requester an option to allow duplicate cursor instances or not. When the application server sends the second statement to open the same cursor, and the DQA parameter is set to TRUE for the second statement, then the database server 302 will create the second instance 702 of the cursor and return the second query identifier. However, care should be taken that the open cursor statements are not executed in an infinite loop. Otherwise, the database system will continually create new instances of the same cursor, resulting in a flooding of the database memory.

Figure 8:
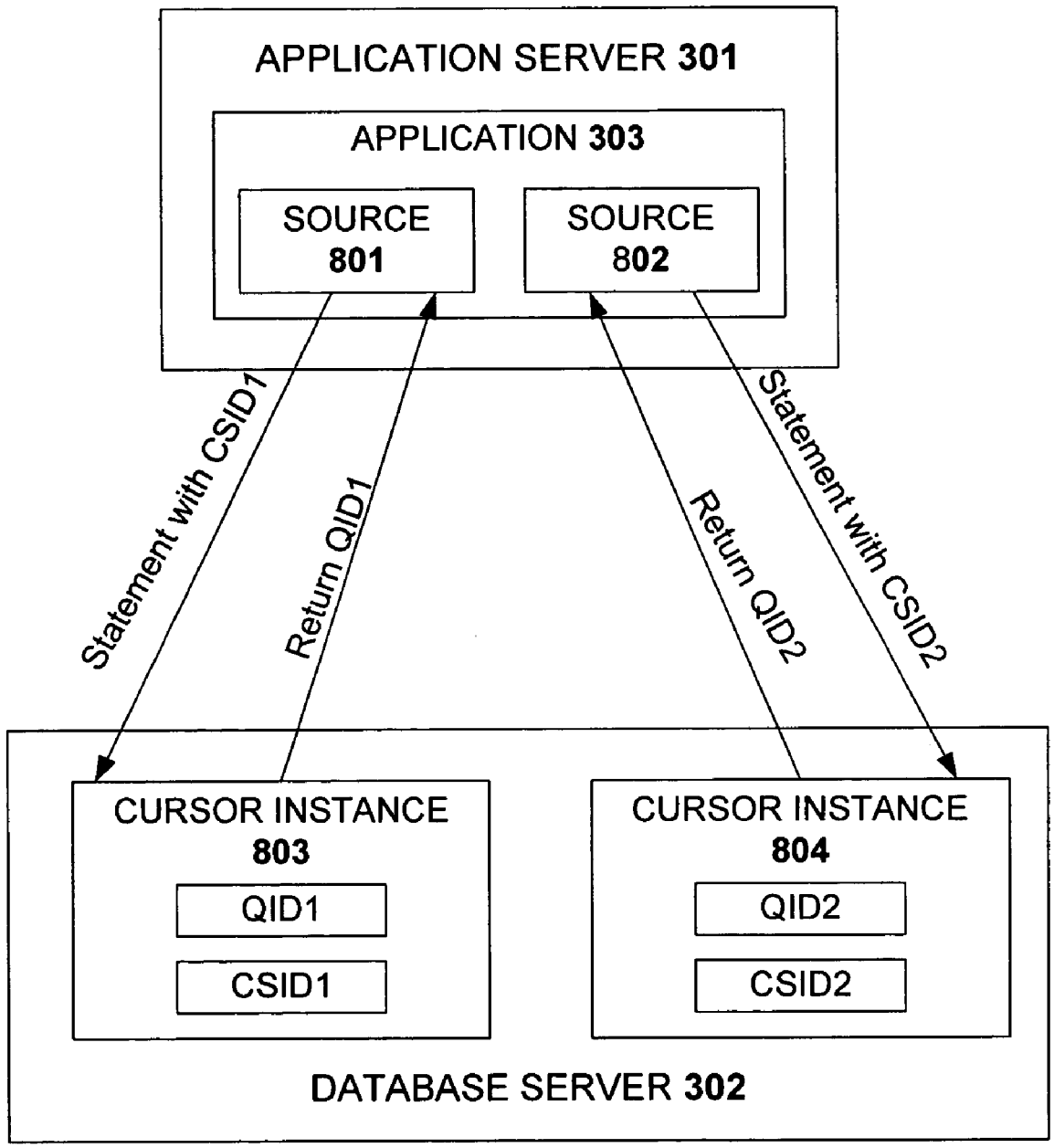
FIG. 8 is a block diagram illustrating using the combination of the command source identifier and the query identifier to avoid section collision for application server requests multiplexed over a single database connection in accordance with the present invention.

The query identifier and the command source identifier can be used separately or in combination. For example, as illustrated in FIG. 8, assume that a first application source 801 within the application 303 sends a query statement to open a cursor to the database server 302 using a database connection. The query statement from the first application source 801 is assigned a first command source identifier, CSID1, by the application server 301. A second application source 802 within the application 303 sends a query statement to open the same cursor to the database server 302 using the same database connection. The first instance 803 of the cursor opened in response to the query statement with CSID1 is assigned a first query identifier, QID1, by the database server 302. The second instance 804 of the cursor opened in response to the query statement with CSID2 is assigned a second query identifier, QID2, by the database server 302. By using the combination of the command source identifiers and the query identifiers, the database server 302 can process each query and cursor instance separately from and in parallel with the others without section collision.

A method and system for avoiding section collision for application server requests over a single database connection have been disclosed. In the method and system, the database server assigns query identifiers to each instance of the same cursor opened for the same processing level within an application. This allows multiple instances of the same cursor to be processed in parallel without section collision. In the method and system, the application server assigns a command source identifier to each statement sent over a single database connection to uniquely identify the application source of the statement. The command source identifier uniquely identifies the application source for multiples of the same statement sent by different application sources within the same application, the application sources for a single statement containing multiple application sources, and the application for multiple statements from different applications multiplexed over a single database connection. These statements can be processed separately from and in parallel with the each other without section collision.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for avoiding section collision for application server requests over a single database connection between a database server and an application server, the method comprising:
- (a) receiving a first statement assigned a first command source identifier by the database server from a first application source over the single database connection, the first command source identifier uniquely identifying an application source to the first statement;
- (b) receiving a second statement assigned a second command source identifier by the database server from a second application source over the single database connection, wherein the first statement is substantially identical to the second statement;
- the second command source identifier uniquely identifying an application source to the second statement and,
- (c) executing the first statement assigned a first command source identifier separately from and in parallel with the second statement assigned the second command source without section collision.

2. The method of claim 1, wherein the first and second command source identifiers are assigned by the application server.

3. The method of claim 1, wherein the first application source and the second application source are different application sources within a same application.

4. The method of claim 1, wherein the first statement assigned the first command source identifier and the second statement assigned the second command source identifier are combined into a single statement containing the first and second application sources, wherein a portion of the single statement pertaining to the first application source is assigned the first command source identifier, and wherein a portion of the single statement pertaining to the second application source is assigned the second command source identifier.

5. The method of claim 1, wherein the first application source is within a first application and the second application source is within a second application.

6. The method of claim 1, wherein the first statement assigned the first command source identifier is a statement to open a cursor and wherein the second statement assigned the second command source identifier is a statement to open the cursor.

7. The method of claim 6, wherein the executing (c) further comprises:
- (c1) creating a first instance of the cursor in response to the first statement assigned the first command source identifier;
- (c2) assigning a first query identifier to the first instance of the cursor by the database server;
- (c3) creating a second instance of the cursor in response to the second statement assigned the second command source identifier;
- (c4) assigning a second query identifier to the second instance of the cursor by the database server; and
- (c5) returning the first query identifier and second query identifier to the application server.

8. A method for avoiding section collision for application server requests over a single database connection, the method comprising:
- (a) receiving a first statement to open a cursor by a database server over a single database connection between the database server and an application server;
- (b) creating a first instance of an open cursor in response to the first statement;
- (c) assigning the first instance a first query identifier, the first query identifier uniquely identifies the first instance of the open cursor;
- (d) receiving a second statement to open the cursor by the database server over the single database connection before the first instance of the open cursor closes;
- (e) creating a second instance of the open cursor in response to the second statement; and
- (f) assigning the second instance a second query identifier, the second query identifier uniquely identifies the second instance of the open cursor.

9. The method of claim 8, wherein the first and second query identifiers are assigned by the database server.

10. The method of claim 8, further comprising:
- (g) processing the first instance of the cursor separately from and in parallel with the second instance of the cursor.

11. The method of claim 8, further comprising:
- (g) returning the first and second query identifiers to the application server.

12. The method of claim 11, wherein subsequent statements received by the database server for the first instance of the cursor include the first query identifier.

13. The method of claim 11, wherein subsequent statements received by the database server for the second instance of the cursor include the second query identifier.

14. The method of claim 8, wherein the first statement is from a first application source and is assigned a first command source identifier, and the second statement is from a second application source and is assigned a second command source identifier.

* * * * *